Jan. 22, 1929.
C. M. WATROUS
1,700,004
METHOD OF MAKING WHEELS
Original Filed May 8, 1924
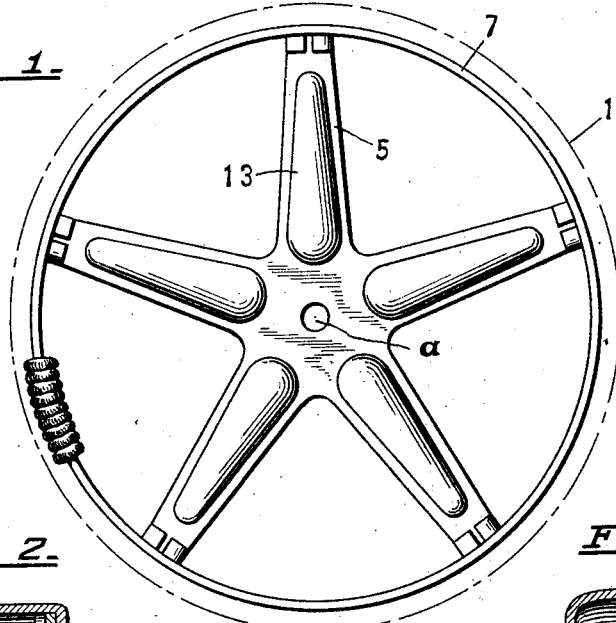
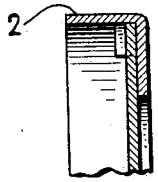
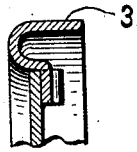
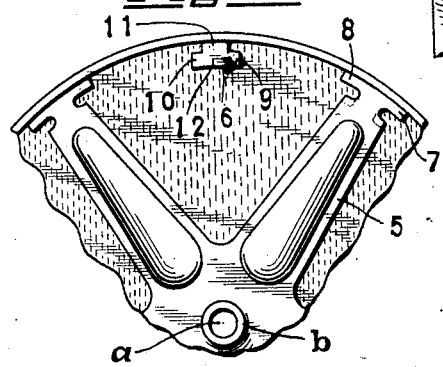
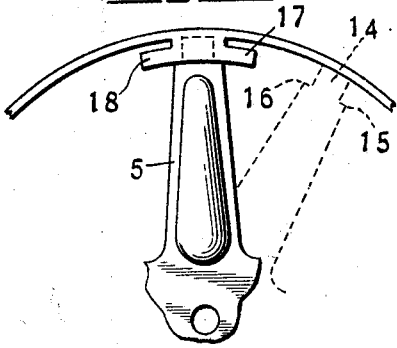
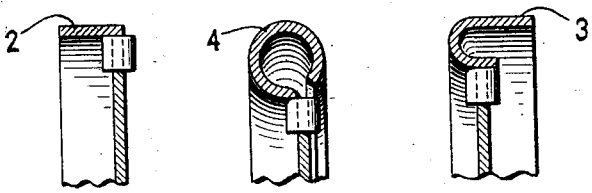
INVENTOR
*Clifford M. Watrous,*
BY
ATTORNEY Patented Jan. 22, 1929.

1,700,004

UNITED STATES PATENT OFFICE.

CLIFFORD M. WATROUS, OF EAST HAMPTON, CONNECTICUT, ASSIGNOR TO GONG BELL MANUFACTURING COMPANY, A CORPORATION OF CONNECTICUT.

METHOD OF MAKING WHEELS.

Original application filed May 8, 1924, Serial No. 711,824. Divided and this application filed February 28, 1925. Serial No. 12,358.

This invention relates in general to wheels and, as discussed herein, is particularly directed to wheels employed on toys of various types and forms which to the trade are known as "rolling toys."

It more especially pertains to wheels, which may be made upon a very economical basis, with a minimum of scrap waste of material from which they are formed.

Wheels of this character are employed in simulation of standard types of wheels such as are used on vehicles, as for instance, bicycles, automobiles and machines where comparatively large tread portions or tires are employed.

The main purpose of the invention is largely to produce an extremely inexpensive type of wheel which will have all the desired effects as to strength and appearance of vehicle wheels and particularly those having large treads so commonly employed on pleasure and commercial vehicles.

Another object from a manufacturing standpoint, is to produce wheels with a minimum scrap loss and with unusual strength and durability. There is also an advantage in producing a high grade wheel for toys which will run evenly and smoothly and may be assembled with ease and certainty. For instance, cast wheels or form wheels, must usually be "trued up" to provide smooth, even running toys.

This invention contemplates the production of a wheel that will have all the desirable advantages as to true running, uniformity and attractive appearance at a minimum expenditure for material and labor.

The wheels herein described are formed by a method of pressing up and stamping with dies to provide absolute uniformity, and precision with the various advantages heretofore enumerated.

Wheels made, as described herein, are centered and the peripheral edges are drawn or upset from sheet metal stock of comparatively thin material, ductile enough to be punched, curled and deformed to provide any desired effect.

The method and claims of this application form a division of my application, Serial No. 711,824, filed May 8, 1924.

The drawings are illustrative of the wheel produced under the method herein described.

Referring to the drawings:

Fig. 1, illustrates a wheel in side elevation embodying the invention.

Fig. 2, is a sectional view on an enlarged scale through one of the spoke sections.

Fig. 3, is a similar view showing a slightly different degree of curvature for the tire section, taken in sections similar to Figure 2.

Fig. 4, is a similar view in section illustrating a more rounded tire section.

Fig. 5, is a view of the blank illustrating the manner of blanking out the spokes, hub and attached elements.

Fig. 6, illustrates a slightly modified or reversed form of attaching means between the spokes and rim sections.

Figs. 7, 8 and 9, show tire portions similar to those of Figs. 2, 3, and 4, as applied to the modified form of spoke of Fig. 6.

In producing the wheels, a sheet of metal is employed, which is first blanked up to a disc form, somewhat larger than the finished outside diameter of the wheel.

In blanking out the disk, it is centrally perforated to provide an axle opening or attaching means and during this blanking operation, it may be drawn out somewhat about the perforation to form a hub.

The disc is blanked out and centrally pierced as at $a$. The metal about this perforation may be drawn out to any desired extent to form a hub $b$.

At the outer edge of the blank the metal is upset or curled to any desired shape as for instance, at 2, 3, 4, illustrated in Figs. 2 to 4, and 7 to 9, inclusive.

This upsetting and curling of the outer peripheral edge of the disk provides a tread of any one of a series of shapes, there being either a slight right angle turn as at 2, in Figure 2, or an extended tread as at 3, Figure 3, or a curled or rounded tread as at 4, Figure 4.

This curling or upsetting of the edge may take any form dependent upon the dies employed and to give any style of tread.

After the sheet metal has been blanked out, to disk form, piercing dies are employed for stamping out the body of the interior to provide spoke elements 5, and attaching elements 6. This is illustrated in Figure 5, where the shaded portion of the drawing represents the waste material stamped out of the interior body part of the disk, leaving the spokes 5, the outer ends of which are formed as illustrated with clamping ears 7, 8.

In stamping out these spokes, there is also left in the interior portion of the disk, elements 6, which are undercut as at 9, 10, leaving an intermediate neck 11, about which the ears 7, 8, of the spokes may be clamped.

The lower portion 12, extends downward a sufficient distance to give a supporting brace against the flat portion of the spoke.

It is apparent that the entire central portion of the disk is left intact except for the piercing at a, and the several spokes of the wheel.

By leaving the attaching elements 6, during the punching operation, a means of reconnecting the ends of the spokes with the rim or felloe section of the wheel, is provided.

After the stamping out of the material, in shaded lines, the spoke elements are free to be brought into radial line with the attaching element 6. With a suitable die, the ears 7, 8, are folded about the neck 11, substantially filling the cutaway portions 9, 10. This gives an extremely rigid connection between the rim and spokes.

Where a comparatively thin sheet metal is employed, the stiffness may be enhanced, by embossing the spoke sections with suitable dies, to give any appropriate design. These embossing dies, of course, merely deform the metal as illustrated, for instance at 13, Figure 1. Of course, the offsetting or curling or rolling up of the peripheral edge of the disk gives a very stiff rim to the wheel.

Ordinarily, in a cut out wheel, where the spokes are blanked out from sheet and the rim is blanked out from a similar sheet, there is a large scrap loss. The method herein described, works a considerable economy in reducing the scrap of these blanking operations by forming the spokes from one portion of the disk and the attaching means for the spokes as a dependent element from the rim.

In Figures 6 to 9, inclusive, there is illustrated, a similar method in which the spoke sections are stamped out with reduced ends 14, providing shoulders 15, 16. The interior portion of the rim is stamped to provide ears 17, 18.

These ears 17, 18, are folded about the reduced ends 14, of the spokes and against the shoulders, 15, 16, thus giving, what is in effect, a reversal of the form of attaching elements illustrated in Figs. 1 to 5.

In this case, however, as in the case of Figs. 1 to 5, spokes are blanked out of the material of the disk, thus saving scrap.

The rim section and the spoke and hub section are all blanked out of sheet metal within the diameter of the original blank.

It will be quite obvious, that by thus forming the comparatively thin sheet metal into wheels, an unusually stiff, strong and inexpensive structure is produced and where the metal is deformed, its stiffness for the wheel is increased. Furthermore, structures of uniformity, with smooth peripheral tread, whether said treads are of annular like form or curled or offset form, result from the use of dies.

The resultant advantages, in assembling of toys, are quite obvious, as the wheels may be produced true to size requiring no fitting such as reaming, centering or turning.

In wheels of this type, it is quite easy to produce an attractive toy wheel having a resilient tread, by winding about the peripheral edge of the rim or felloe, a chenille or like material which will completely cover it and provide a soft non-scratching running tread.

Such a type of wheel may be produced with a minimum of material by using a short turned flange at the periphery edge, which wound with the chenille or other resilient material, will give the appearance of a heavily tired wheel and a comparatively small amount of winding material is necessary to completely cover the metal.

In manufacturing toy wheels from very light and thin metal stock such as is employed in carrying out my invention, it is desirable that there should be reinforcement of the wheel where the spokes join with the rim, in order that the wheels shall have the necessary strength to resist lateral strains; and this is secured by my invention, as the reuniting of the ends of the spokes with the tire or tread rim in the manner described insures there being several thicknesses of metal where each connection is made.

What I claim as my invention and desire to secure by Letters Patent is:

1. The method of producing wheels which consists in forming a disk of metal shaping the periphery thereof under dies, to form a tire or tread, cutting said tread section from the disk and cutting spokes therefrom and reassembling the cut out rim and cut out spokes and uniting them to form a spoked wheel with a tire or tread.

2. The method of producing wheels which consists in forming a disk of metal, shaping the periphery thereof under dies to form a tire or tread, cutting the tread section, so formed, from the disk, cutting a central spoke section from the material within the tire or tread section, providing a central axle attaching means for the spoke section, reassembling the cut out rim and cut out spokes and uniting them to form a spoked tired wheel with an axle attaching means.

3. A method of producing wheels which consists in forming a disk of metal, shaping the periphery thereof to form a tire or tread, cutting such tread section from the disk, leaving a spoke spider, deforming the spokes of the spoke spider and reassembling the tire or tread and spoke spider and uniting them to form a spoked wheel with a tire.

4. A method of manufacturing toy wheels, which consists in forming a disk of sheet metal, shaping the periphery thereof to form a tire or tread, cutting such tread section from the disk, cutting a central spoke section from the disk and discarding the scrap produced by such cutting operations, and reassembling the rim and spoke sections and uniting them to form a spoked wheel with a tire rim.

5. A method of producing toy wheels, which consists in producing a sheet metal disk, cutting therefrom an annular rim section and providing on the inside thereof, integral attaching means, cutting from the blank, a central spoke section and forming at the ends of the spokes attaching means, and bringing together the attaching means of the annular rim section and the attaching means of the spoke section and interlocking them to form a spoked wheel with a peripheral rim.

6. A method of producing metal wheels which consists in forming a disk-like blank of metal, deforming the edge of the disk to produce a tread portion, blanking out the disk to produce a spoke section and a rim felloe section and also certain scrap sections, reassembling the spoke section thus produced with reference to the felloe section with the ends of the spokes overlapping the felloe section, and uniting said parts where they overlap.

7. A method of producing wheels which consists in producing a disk-like blank, deforming the edge of said disk blank to produce a tread and felloe portion, blanking the disk to produce a spoke section, reuniting the spoke section so blanked to the felloe section at a different position than that from which it was blanked out.

8. A method of producing toy wheels which consists in producing a disk-like blank from a sheet of thin metal, curling the edge of said metal to provide a felloe and tread, embossing the disk as to certain portions of its surface and piercing it at its center, blanking out a spoke spider and hub about the embossed and pierced portions, and reuniting the spoke spider and felloe portions in superposed relations one to the other to form a complete wheel.

CLIFFORD M. WATROUS.